Patented Jan. 16, 1934

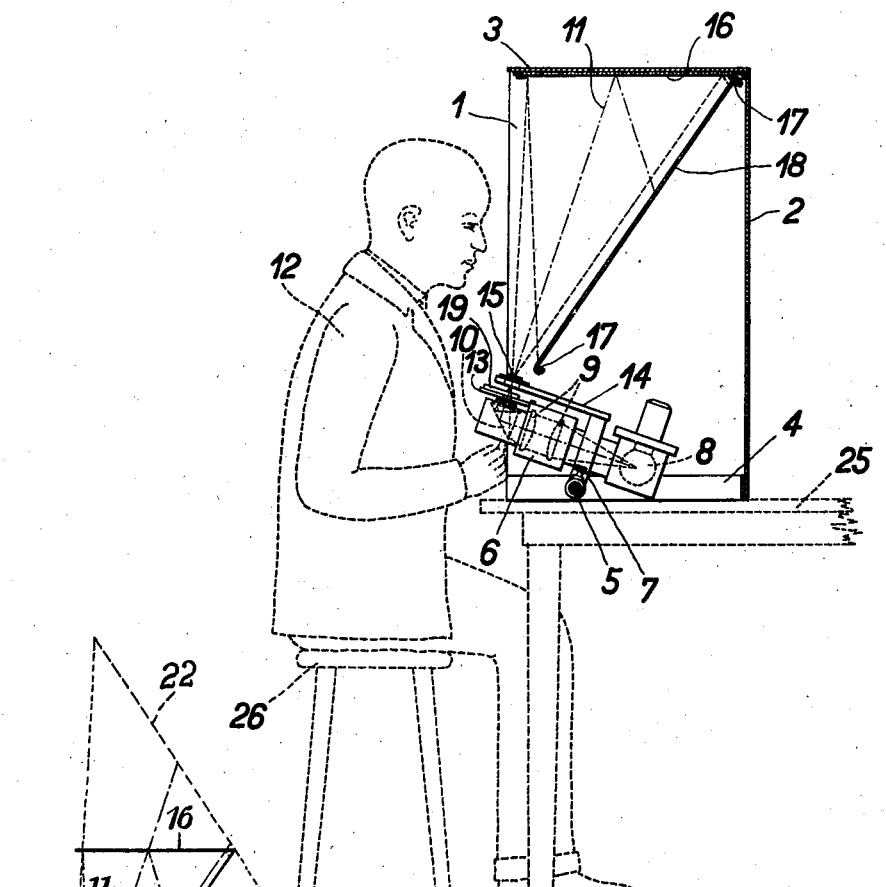
Fig. 1.
Fig. 2.
Inventors:
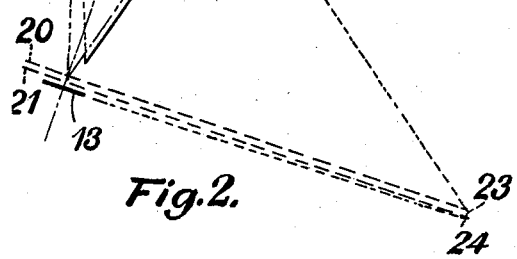

1,943,508

UNITED STATES PATENT OFFICE 1,943,508

INSTRUMENT FOR RAPID EXAMINATION OF TRANSPARENT MICROSCOPIC PREPARATIONS

Walther Bauersfeld and Max Hübschmann, Jena, Germany, assignors to firm Carl Zeiss, Jena, Germany Application March 5, 1932, Serial No. 596,934, and in Germany March 10, 1931

2 Claims. (Cl. 88—24)

We have filed an application in Germany, March 10, 1931.

When a great number of transparent microscopic preparations are to be examined rapidly it is convenient to use a projection device instead of a microscope for subjective use. The usual projection devices, however, are not very practical for this purpose, since the axis of the pencil of projection rays is generally horizontal and the image is projected on a screen which is approximately vertical. The greatest drawback is that the preparations, which are often liquid preparations, are to be examined in vertical positions. This disadvantage is overcome by the invention, which provides an instrument that can easily deal with the said task, which obtains especially when butcher's meat is to be inspected. The invention attains this purpose by means of a projection device in which, when in position for use, the axis of the pencil of projection rays is slightly inclined in such a manner that it goes from below in upward direction away from the observer, the projection device being connected with a reflector lying approximately horizontal in the ray path of the projection rays as well as with a screen the projection surface of which is approximately parallel to the rear exterior projection rays of the projection ray pencil striking the reflector. The consequence of this position of the projection surface, which permits the observer to assume a comfortable posture and to view the arising image from a very small distance, is, however, that the magnification of the image is different relatively to the different lengths of the path of the projection rays. Nevertheless, this drawback and the consequent distortion of the image are no disadvantage in the present case. The stronger objective magnification on the lower part of the projection surface is subjectively increased by the fact that this lower part is nearer the observer's eye than the upper one. In order to see very clearly any part of the preparation this preparation is suitably so displaced in its plane that the image of the part to be examined appears on the lower end of the projection surface. This arrangement consequently offers the advantage that a great image field can be easily looked over and that any part of the images can be easily viewed at a stronger magnification, an advantage which could be obtained hitherto, in a complicated manner, only by using exchangeable projection objectives of different focal lengths.

It is the general practice to provide the objects to be projected in a plane perpendicular to the axis of the transmitted pencil of light rays. An object provided in this manner is imaged in a plane which is perpendicular to the axis of the pencil of projection rays. In spite of the inclination which the projection surface is given with the instrument according to the invention, the distance of the object from the rear principal point of the projection objective, which distance generally is a small one, permits to have the object in the usual position, provided that a certain unclear definition of part of the projected image is put up with. This unclear definition, however, can be neutralized by means of the fine focussing device of the objective, which is provided in most cases and manipulated by the observer for other reasons. Nevertheless, an improvement is possible also in this case, viz when the object is not provided in a plane perpendicular to the objective axis but is inclined relatively to this axis by an angle so deviating from 90° that the object plane and the projection surface are conjugated to each other relatively to the objective. The objects to be examined generally being preparations between two plano-parallel glass plates, this condition is sufficiently accomplished by providing for these preparations a supporting device the upper surface of which lies in a surface approximately conjugate to the projection surface, relatively to the projection objective.

It is of special advantage to construct the instrument in such a way that it can be used also in day light. This is possible by applying a light-protection device enveloping the instrument and leaving that side open at which the examiner is to effect examinations.

The accompanying drawing represents a constructional example of the invention. Figure 1 shows the example in a central section in elevation. Figure 2 is a schematic reproduction of the path of the projection rays.

The instrument has a housing of sheet iron consisting of side walls 1, a back wall 2, and a cover 3. The lower end of the housing is stiffened by means of an iron strip 4. This iron strip 4 supports a round iron bar 5 to which a projection apparatus 6 is fixed by means of an adjusting screw 7. The projection apparatus 6, which contains an incandescent lamp 8 serving as a light source, a two-lens condenser 9, and a reflecting prism 10, is slightly inclined in such a manner that the axis 11 of the pencil of light rays deflected by the reflecting prism 10 goes from below in upward direction away from the observer 12 into the interior of the housing 1. On the projection apparatus 6 is provided an object stage 13, and on a support 14 a projection objective 15. The cover 3 of the housing is provided on its lower side with a horizontal plane reflector 16, and in the housing there is spread over two rods 17 a projection screen 18 the surface of which is approximately parallel to the rear exterior rays of the pencil of projection rays striking the reflector 16.

The relations represented by Figure 2 provide that a preparation 19 resting on the object stage 13 is projected on the projection screen 18 in such a manner that it is sharply imaged all over. 20 and 21 designate the planes which go through the principal points of the objective 15 and are perpendicular to the axis 11. The position of the projection screen 18 coincides with the image of an assumed projection screen 22, this projection screen 22 being produced by the reflector 16 and the plane of this screen 22 intersecting the plane 20 in the line 23. The plane of the table 13 intersects the plane 21 in a line 24 which is conjugate to the line 23. In other words, the plane of the assumed projection screen 22, and, owing to the reflection on the reflector 16, the plane of the projection screen 18, and the plane of the stage 13 are conjugate to each other with respect to the objective 15. The stage 13 therefore is to have such a position that its plane is not exactly perpendicular but inclined relatively to the axis 11 of the pencil of light rays, as is shown in Figure 2.

When the instrument is to be used, it is so placed on a table 25 that the iron strip 4 rests on this table, and the incandescent lamp 8 is connected to a source of current. The examiner 12 takes his seat on a stool 26 or the like in front of the open side of the housing. The preparations 19 to be examined are laid on the stage 13 and given by hand the positions in which those of their parts which are to be viewed are imaged on the screen 18. Any access of light from the side and from above to the projection screen 18 is effectively prevented by the housing, so that the observer looking into the dark housing 12 is presented the images also when the instrument is placed in broad daylight.

We claim:

1. An instrument for rapid examination of transparent microscopic preparations, containing a light source, a projection objective, a projection screen, the axis of the projection objective being inclined away from a vertical direction and towards the projection screen, a support for the preparations to be examined, this support being disposed between the light source and the projection objective, and a horizontal reflector provided above the projection objective, the projection surface of the projection screen being approximately parallel to the rear exterior rays of the projection ray pencil striking the reflector.

2. An instrument for rapid examination of transparent microscopic preparations, containing a light source, a projection objective, a projection screen, the axis of the projection objective being inclined away from a vertical direction and towards the projection screen, a support for the preparations to be examined, the instrument being provided with a supporting surface for the preparations, this supporting surface being disposed between the light source and the projection objective, and a horizontal reflector provided above the projection objective, the projection surface of the projection screen being approximately parallel to the rear exterior rays of the projection ray pencil striking the reflector, the said supporting surface being inclined relatively to the axis of the projection objective by an angle so deviating from 90° that the said supporting surface lies in a plane conjugate to the projection surface relatively to the projection objective.

WALTHER BAUERSFELD.
MAX HÜBSCHMANN.